(12) United States Patent
Hild et al.

(10) Patent No.: US 9,187,572 B2
(45) Date of Patent: Nov. 17, 2015

(54) TREATMENT OF POLYSACCARIDES WITH DIALDEHYDES

(75) Inventors: Alexandra Hild, Soltau (DE); Matthias Sprehe, Walsrode (DE); Axel Altmann, Walsrode (DE); Roland Adden, Walsrode (DE)

(73) Assignee: Dow Global Technologies LLC

( * ) Notice: Subject to any disclaimer, the term of this patent is extended or adjusted under 35 U.S.C. 154(b) by 208 days.

(21) Appl. No.: 13/822,118

(22) PCT Filed: Sep. 15, 2011

(86) PCT No.: PCT/US2011/051703
§ 371 (c)(1),
(2), (4) Date: Mar. 11, 2013

(87) PCT Pub. No.: WO2012/040024
PCT Pub. Date: Mar. 29, 2012

(65) Prior Publication Data
US 2013/0172290 A1   Jul. 4, 2013

Related U.S. Application Data

(60) Provisional application No. 61/385,359, filed on Sep. 22, 2010.

(51) Int. Cl.
C08B 11/00 (2006.01)
C08B 11/20 (2006.01)
C08B 15/00 (2006.01)

(52) U.S. Cl.
CPC ............... *C08B 11/00* (2013.01); *C08B 11/20* (2013.01); *C08B 15/005* (2013.01)

(58) Field of Classification Search
None
See application file for complete search history.

(56) References Cited

U.S. PATENT DOCUMENTS

| | | | |
|---|---|---|---|
| 3,297,583 A | 1/1967 | Dierichs et al. | |
| 3,871,625 A | 3/1975 | Iwako | |
| 3,997,508 A | 12/1976 | Ziche | |
| 4,041,234 A | 8/1977 | Maske | |
| 4,537,958 A | 8/1985 | Strange et al. | |
| 4,645,812 A | 2/1987 | Maier | |
| 4,979,681 A | 12/1990 | Donges et al. | |
| 5,149,455 A * | 9/1992 | Jacobs et al. | 510/443 |
| 5,432,215 A | 7/1995 | Girg et al. | |
| 5,674,999 A | 10/1997 | Smith et al. | |
| 6,509,461 B2 | 1/2003 | Schlesiger et al. | |
| 6,880,772 B2 | 4/2005 | Schlesiger et al. | |
| 7,012,139 B2 | 3/2006 | Schlesiger et al. | |
| 7,098,177 B1 * | 8/2006 | Kubota et al. | 510/444 |
| 7,259,257 B2 | 8/2007 | Schlesiger et al. | |
| 2006/0057389 A1 * | 3/2006 | Reimann et al. | 428/411.1 |

FOREIGN PATENT DOCUMENTS

| | | |
|---|---|---|
| GB | 1080249 | 8/1967 |
| WO | 2008/086023 A1 | 7/2008 |
| WO | 2010/000408 A1 | 1/2010 |

OTHER PUBLICATIONS

Habermann, Nobilta—Solids Mixing with High Energy Intensity, Keramische Zeitschrift, vol. 4, pp. 254-259, 2007.

Klemm. et al., Comprehensive Cellulose Chemistry, vol. 2, Functionalization of Cellulose, pp. 217243, 1998.

\* cited by examiner

*Primary Examiner* — Eric Olson
*Assistant Examiner* — Dale R Miller

(57) ABSTRACT

A process for treating a polysaccharide with a dialdehyde in the presence of from 10 to 40 weight percent of water, based on the total weight of polysaccharide and water, is beneficially conducted in a mixing device characterized by a FROUDE number $FR_w$ of larger than 11, wherein $\omega_w$ is the angular frequency in sec-1 and is defined as $2*\pi*RPM/60$, RPM is the rotational speed of the mixing device in revolutions per minute, $R_w$ is the radius of the mixing device in m, and g is the acceleration due to gravity in m/s².

$$Fr_w = \frac{\omega_w^2 R_w}{g}$$

14 Claims, 2 Drawing Sheets

TREATMENT OF POLYSACCARIDES WITH DIALDEHYDES

CROSS REFERENCE TO RELATED APPLICATIONS

This application is a 35 USC §371 national phase filing of PCT/US2011/051703 filed Sep. 15, 2011, which claims the benefit of U.S. Application No. 61/385,359, filed Sep. 22, 2010.

FIELD

The invention relates to a process for treating a polysaccharide with a dialdehyde.

BACKGROUND

Water-soluble polysaccharides, such as water-soluble cellulose ethers have found widespread use in many applications, such as binders, thickeners, or protective colloids. The most important properties of cellulose ethers are their solubility combined with chemical stability and non-toxicity. Water solubility and/or organo-solubility can be controlled within wide ranges by different types of ether substituents at the cellulose chain, as well as via the degree of substitution (DS) and the pattern of substitution. Accordingly, cellulose ethers are generally applied, in the dissolved or highly swollen state, to many areas of industry and domestic life, with the spectrum of applications ranging from auxiliaries in large-scale emulsions or suspension polymerization, through to additives for paints and wall paper adhesives, to viscosity enhancers in cosmetics and foodstuffs.

However, introduction of a cellulose ether which is normally in dry powder form into water or aqueous systems is frequently associated with problems, since water-soluble cellulose ethers tend to gel on the surface when added to water, and form lumps. This results in undesirably long dissolution times.

It has been known for a long time that the dissolution behavior of cellulose ethers can be influenced by means of an after- or post-treatment to counteract these problems. One known method is the reduction of the initial dissolution rate, often called "delayed or retarded solubility" to ensure that the cellulose ether is homogeneously distributed in water before starting to dissolve. This delay can be achieved, for instance, by a reversible cross-linkage with glyoxal.

U.S. Pat. Nos. 3,297,583; 3,997,508 and 5,674,999 for example, describe a process for pretreating cellulose ethers in essentially dry state with lower alkyl aldehydes and lower alkyl dialdehydes, such as glyoxal. U.S. Pat. Nos. 3,997,508 and 5,674,999 disclose that the treatment with glyoxal is followed by heating. The glyoxal treatment in U.S. Pat. No. 5,674,999 is conducted in a high intensity mixer. Unfortunately, quite high glyoxal concentrations are typically needed to achieve a sufficiently retarded solubility. Reducing the glyoxal concentrations often results in a solubility which is not sufficiently retarded for many applications. Moreover, the heating step disclosed in U.S. Pat. Nos. 3,997,508 and 5,674,999 can have a negative impact on the cellulose ether, such as partial degradation or partial discoloration, additional time needed for the heating step and the difficulty in achieving a consistent degree of cross-linking.

British Patent Specification GB 1,080,249 discloses a process wherein powdered methyl cellulose with a water content of 40 to 70% is kneaded at a pH value between 3 and 7 to a homogeneous mass with a water-soluble dialdehyde. U.S. Pat. No. 7,012,139 discloses the treatment of a moist cellulose ether having a water content of 40 to 80% with glyoxal in a twin-screw extruder in the presence of an alkali metal dihydrogen phosphate and a di(alkali metal) hydrogen phosphate. Unfortunately, the high water content has several disadvantages, such as high stickiness of the cellulose ether, which makes its handling during and after glyoxal treatment more difficult. Moreover, the high water content increases the energy demand for drying and grinding the cellulose ether.

SUMMARY

In one aspect, the present invention relates to a process for treating a polysaccharide with a dialdehyde which is carried out in the presence of from 10 to 40 weight percent of water, based on the total weight of polysaccharide and water, in a mixing device that is characterized by a FROUDE number $FR_w$ of larger than 11. The FROUDE number $FR_w$ is $$Fr_w = \frac{\omega_w^2 R_w}{g},$$

wherein $\omega_w$ is the angular frequency in $\sec^{-1}$ and is defined as $2*\pi*RPM/60$,
RPM is the rotational speed of the mixing device in revolutions per minute,
$R_w$ is the radius of the mixing device in m, and
g is the acceleration due to gravity in $m/s^2$.

In another aspect, the present invention relates to a method of reducing lumps in a process for dispersing and dissolving water-soluble polysaccharides in water, wherein the polysaccharide is treated with a dialdehyde according to the process above and the treated polysaccharide is dispersed in water.

DETAILED DESCRIPTION

Figure 1:
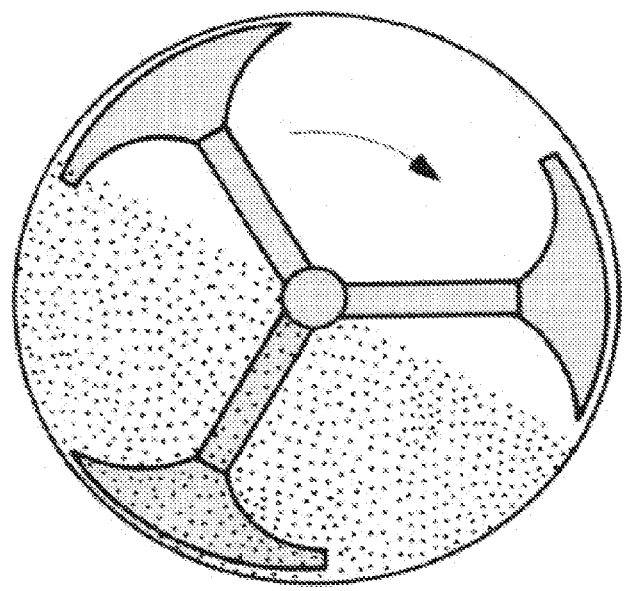
FIG. 1 illustrates the movement of a mass of solid particles in a solid mixer characterized by a FROUDE number $FR_w$ of less than 2.5. The mass of solid particles is shifted within the solid mixer.

It has surprisingly been found that the dissolution of a water-soluble polysaccharide in water can be retarded for a longer time period or the same retardation time can be achieved with a smaller amount of a dialdehyde when the treatment with a dialdehyde is conducted in the presence of from 10 to 40 percent of water, based on the total weight of polysaccharide and water, than when an essentially dry polysaccharide is treated, such as in the processes described in U.S. Pat. Nos. 3,297,583; 3,997,508 and 5,674,999. One of the most frequently used dialdehydes for pretreating polysaccharides is glyoxal. As described in International Patent Application WO2008/086023, in consumer products and especially in the personal care industry, there is a safety concern regarding the presence of glyoxal in formulation ingredients. Reducing the amount of glyoxal for pretreating polysaccharides is a long-felt need in the industry.

Accordingly, one essential feature of the present invention is that the treatment of a polysaccharide with a dialdehyde is carried out in the presence of at least 10 percent, preferably at least 15 percent, more preferably at least 20 percent, most preferably at least 25 percent, and, depending on the type of polysaccharide, particularly at least 30 percent of water, based on the total weight of polysaccharide and water. It is to be understood that the optimum water content slightly depends on the type of polysaccharide. For example, for cellulose ethers which have substantially ionic or hydrophilic properties and which show no flocculation behavior in water at any temperature up to 100° C., such as carboxy-$C_1$-$C_3$-alkyl celluloses, like carboxymethyl celluloses; or carboxy-$C_1$-$C_3$-alkyl hydroxy-$C_1$-$C_3$-alkyl celluloses, like carboxymethyl hydroxyethyl celluloses, hydroxy-$C_{1\text{-}3}$-alkyl celluloses, like hydroxyethyl celluloses; or ethyl hydroxyethyl celluloses, it is preferred to carry out the process in the presence of at least 20 percent, more preferably at least 25 percent, and most preferably at least 30 percent of water, based on the total weight of polysaccharide and water. In the case of water-soluble cellulose ethers which have hydrophilic and hydrophobic properties and which show a flocculation behavior in water at a temperature below 100°, such as $C_1$-$C_3$-alkyl celluloses, like methylcelluloses; hydroxy-$C_{1\text{-}3}$-alkyl methyl celluloses like hydroxyethyl methylcelluloses or hydroxypropyl methylcelluloses; a water content of 10 percent or more, preferably of 15 percent or more, more preferably of 20 percent or more, based on the total weight of polysaccharide and water, is sufficient in the process of the present invention. The position of the flocculation point, so called flocculation temperature, depends on the ratio of the hydrophobic and hydrophilic degree of substitution and the length of the alkyl chains. For example, a predominance of hydroxyethylation allows the flocculation point to be raised so far that a flocculation in water is not detectible anymore, see Comprehensive Cellulose Chemistry, Volume 2, Klemm, D. et al., Wiley-VCH Verlag GmbH, 1998, p. 217-243.

It is also essential that the process of the present invention is carried out in the presence of up to 40 percent, preferably up to 35 percent, more preferably up to 33 percent, and, most preferably up to 30 percent of water, based on the total weight of polysaccharide and water. It has been found that these upper limits of the water content provide an optimum combination of long delay in dissolution of polysaccharides in water by means of the dialdehydes treatment and a high energy efficiency of the process, since the amount of water to be evaporated in the subsequent milling and drying process is minimized, typically combined with improved material handling properties and a low stickiness of the polysaccharide.

It has also surprisingly been found that carrying out the process of the present invention in a mixing device that is characterized by centrifugal mixing with a FROUDE number $FR_w$ of larger than 11 enables that the present invention is carried out in the presence of up to 40 percent, preferably up to 35 percent, more preferably up to 33 percent, and most preferably up to 30 percent of water, based on the total weight of polysaccharide and water, while still having essentially the same delay in aqueous dissolution of polysaccharides, as compared to known processes carried out in a mixing device of a lower FROUDE number and using a higher amount of water, such as described in U.S. Pat. No. 7,012,139. Due to the moderate water content, the energy required for subsequent drying of the polysaccharide can be minimized by the process of the present invention or the amount of dialdehyde can be reduced.

Accordingly, it is another essential feature of the present invention that the process is carried out in a mixing device that is characterized by a FROUDE number $FR_w$ of larger than 11, preferably at least 50, more preferably at least 200, most preferably at least 500. The upper limitation of the FROUDE number $FR_w$ is generally only given by the design and the motor power of the mixing device. Useful mixing devices generally have a FROUDE number $FR_w$ of up to 2100.

Figure 2:
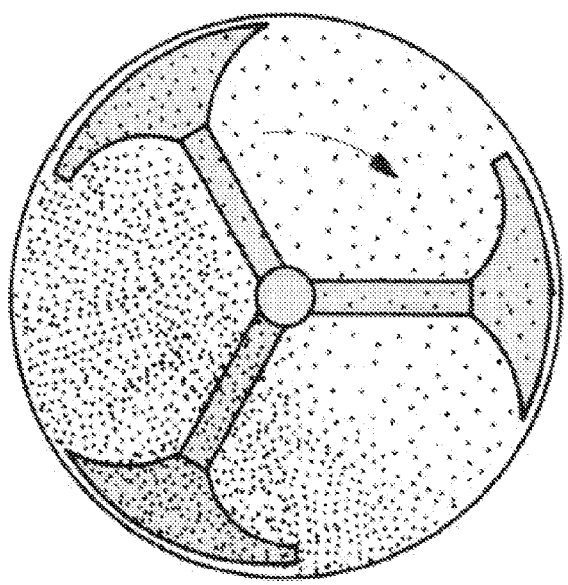
FIG. 2 illustrates the movement of a mass of solid particles in a solid mixer characterized by a FROUDE number $FR_w$ between 2.5 and 11. Individual particles are completely expelled out of the material matrix.
Figure 3:
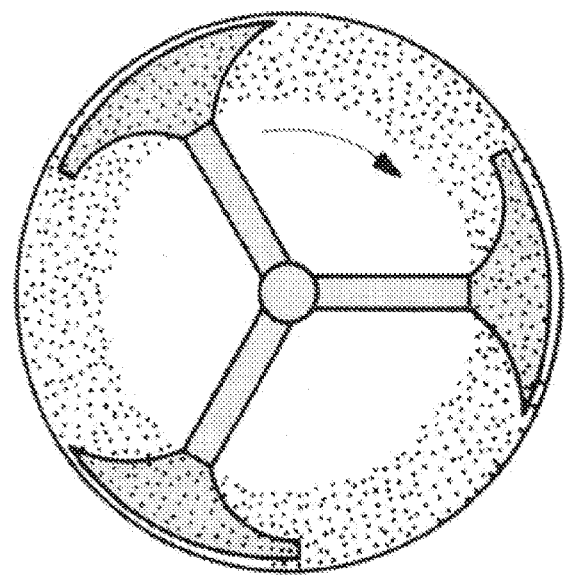
FIG. 3 illustrates the movement of a mass of solid particles in a solid mixer characterized by a FROUDE number $FR_w$ of more than 11. The mass of solid particles is centrifuged in the mixer and forms an annular layer.

The article NOBILTA™—*Feststoffmischen mit hohem Energieeintrag, Teil* 1 (*NOBILTAT™ Solids Mixing with High Energy Intensity, Part* 1) by R. Habermann, KERAMISCHE ZEITSCHRIFT (CERAMIC MAGAZINE) 4-2007, pages 254-259 discusses the movement of a mass of solid particles in a mixing device depending the FROUDE number of the mixing device. FIGS. 1-3 of the subject patent application illustrate the movement of a mass of solid particles in relationship to the FROUDE number of the mixing device. FIG. 1 illustrates the movement of a mass of solid particles in a solid mixer characterized by a FROUDE number $FR_w$ of less than 2.5. The solid mixer comprises a mixing shaft equipped with mixing elements. In this regime the mixer generates relative movements of the solid mass without expelling single particles out of the material. The particle movement is predominated by slipping, slumping and rolling. FIG. 2 illustrates the movement of a mass of solid particles in a solid mixer characterized by a FROUDE number $FR_w$ between 2.5 and 11. The movement of the mixing elements is above the critical speed at which centrifugal forces exceed the gravitational forces whereby solid particles are hurled and thrown out of the material matrix. FIG. 3 illustrates the movement of a mass of solid particles in a solid mixer characterized by a FROUDE number $FR_w$ of more than 11. The centrifugal forces exceed the gravitational forces by far. FIG. 3 illustrates the movement of the mass of solid particles in the process of the present invention, but it is to be understood that the process of the present invention is not limited to the mixer design shown in FIG. 3. The process of the present invention can be carried out in any mixing device that is characterized by a FROUDE number $FR_w$ of larger than 11. Such mixing devices in operation typically cause centrifugation of the mass of solid particles and the formation of an annular layer of solid particles in the mixing device. In a preferred embodiment, the mixing device characterized by a FROUDE number $FR_w$ of more than 11 is a mixer with a mixing shaft, preferably a horizontal or vertical mixer with a mixing shaft, most preferably a continuous high speed horizontal paddle mixer, typically known as ring-layer mixer. Mixing devices that are characterized by a FROUDE number $FR_w$ of larger than 11, preferably at least 50, more preferably at least 200, most preferably at least 500 are high intensity mixer and are available in vertical and horizontal design, such as a continuous high speed horizontal paddle mixer, known as ring-layer mixer. The mixing device generally comprises a horizontal or vertical drum with a mixing shaft axially disposed in it. The mixing shaft typically has blades, bolts, and/or paddles protruding from it. Mixing shaft geometry can create various mixing zones for transporting, dispersing, mixing or compacting. The product to be mixed preferably forms a concentric ring via centrifugal force, and moves through the mixer in plug-like flow. Liquid can be added in different ways. For example, liquid can be introduced by single or mixed phase nozzles tangentially from the top into the annular layer of solid particles. Alternatively, the liquid can be introduced by a rotating hollow shaft through perforated mixing tools directly into the annular layer of solid particles. The residence time varies with rpms, flow rate, amount of material, drum length, and selected mixing shaft geometry. A suitable continuous high speed horizontal paddle mixer, known as ring-layer mixer, can be procured from Loedige (Paderborn, Germany), under the tradename CoriMix CM or from Hosokawa Micron B.V. (Netherlands) under the tradename Turbolizer TC. Another useful mixing device is a flow-jet mixer as described in U.S. Pat. No. 3,871,625. Other useful mixers are vertical flow mixers, which are for example commercially available from Hosokawa Micron B.V. (Netherlands) under the tradename Shugi Flexomix.

The polysaccharide that has not been treated with a dialdehyde according to the process of the present invention is generally water soluble at a temperature below the flocculation point. Preferably it has solubility in water of at least 1 gram, more preferably at least 3 grams, most preferably at least 5 grams in 100 grams of distilled water at 25° C. and 1 atmosphere. Examples of polysaccharides include gum arabic, xanthan gum, gum karaya, gum tragacanth, gum ghatti, carrageenan, dextran, alginates, agar, gellan gum, galactomannans such as guar gum, pectins, starches, starch derivatives, guar derivatives, xanthan derivatives, and cellulose derivatives. Starch derivatives, guar derivatives and xanthan derivatives are described in more detail in European patent EP 0 504 870 B, page 3, lines 25-56 and page 4, lines 1-30. Useful starch derivatives are for example starch ethers, such as hydroxypropyl starch or carboxymethyl starch. Useful guar derivatives are for example carboxymethyl guar, hydroxypropyl guar, carboxymethyl hydroxypropyl guar or cationized guar. Preferred hydroxypropyl guars and the production thereof are described in U.S. Pat. No. 4,645,812, columns 4-6. Preferred polysaccharides are cellulose esters or cellulose ethers. Preferred cellulose ethers are carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$-alkyl hydroxy-$C_{1-3}$-alkyl celluloses, such as hydroxyethyl methylcelluloses, hydroxypropyl methylcelluloses or ethyl hydroxyethyl celluloses; hydroxy-$C_{1-3}$-alkyl celluloses, such as hydroxyethyl celluloses or hydroxypropyl celluloses; mixed hydroxy-$C_1$-$C_3$-alkyl celluloses, such as hydroxyethyl hydroxypropyl celluloses, or alkoxy hydroxyethyl hydroxypropyl celluloses, the alkoxy group being straight-chain or branched and containing 2 to 8 carbon atoms. The carboxy-$C_1$-$C_3$-alkyl celluloses and carboxy-$C_1$-$C_3$-alkyl hydroxy-$C_1$-$C_3$-alkyl celluloses include their salts, preferably their sodium and potassium salts. The most preferred examples thereof are sodium carboxymethyl cellulose and carboxymethyl hydroxyethyl cellulose. More preferably, the cellulose ether is a carboxymethyl cellulose, a methylcellulose, a hydroxypropyl methylcellulose, a hydroxyethyl methylcellulose or a hydroxyethyl cellulose.

Most preferably, a methylcellulose with a methyl degree of substitution $DS_{methyl}$ of from 1.2 to 2.2, preferably from 1.5 to 2.0; or a hydroxypropyl methylcellulose with a $DS_{methyl}$ of from 0.9 to 2.2, preferably from 1.1 to 2.0 and a $MS_{hydroxypropyl}$ of from 0.02 to 2.0, preferably from 0.1 to 1.2; or a hydroxyethyl methylcellulose with a $DS_{methyl}$ of from 0.9 to 2.2, preferably from 1.1 to 2.0 and a $MS_{hydroxyethyl}$ of from 0.02 to 2.0, preferably from 0.1 to 1.2; or a hydroxyethyl cellulose with a $MS_{hydroxyethyl}$ of from 0.7 to 5.0, preferably from 1.3 to 4.5; or a carboxymethyl cellulose with a $DS_{methyl}$ of from 0.3 to 1.4, preferably from 0.6 to 1.2 is utilized in the process of the present invention. The degree of the methyl substitution, DS(methyl), of hydroxypropyl methylcelluose, of hydroxyethyl methylcellulose or of carboxymethyl cellulose is the average number of substituted OH groups per anhydroglucose unit (AGU). The degree of the hydroxyethyl or hydroxypropyl substitution in hydroxyethyl methylcellulose or in hydroxypropyl methylcellulose is described by the MS (molar substitution). The MS (hydroxyethyl) or MS (hydroxypropyl) is the average number of moles of the etherification reagent ethylene oxide or propylene oxide which are bound by an ether bond per mole of anhydroglucose unit.

Mixtures of polysaccharides, such as mixtures of cellulose ethers can also be treated according to the process of the present invention. Generally the weight average molecular weight of the polysaccharide is from 10,000 g/mol to 5,000,000 g/mol, preferably from 60,000 g/mol to 2000,000 g/mol, more preferably from 80,000 g/mol to 1,300,000 g/mol. The weight average molecular weight can be determined by size exclusion chromatography and light scattering detection (Test Method ASTM D-4001-93 (2006), Handbook Of Size Exclusion Chromatography And Related Techniques: Revised And Expanded Book, Wu, C., Chapter 12, Marcel Dekker Co., New York, 2004).

Useful dialdehydes are, for example, glyoxal, succinic acid dialdehyde or adipic aldehyde. Glyoxal is preferred. More preferably, polysaccharide is treated with a solution of a dialdehyde, most preferably with an aqueous solution of a dialdehyde. The dialdehyde solution is preferably added in such an amount to the polysaccharide that from 0.1 to 4%, more preferably from 0.3 to 2.5% by weight of the active substance, based on the dry cellulose ether, is present. As indicated above, the treatment of the polysaccharide with the dialdehyde is conducted in the presence of from 10 to 40 weight percent of water, preferably from 15 to 35 percent, more preferably from 20 to 35 percent, and most preferably from 25 to 30 percent, based on the total weight of polysaccharide and water. Any amount of water comprised in the dialdehyde solution is to be included in the above-mentioned range of 10 to 40 weight percent. There are several ways of controlling the required amount of water. For example, it can be controlled by contacting the dialdehyde with a moist polysaccharide comprising a corresponding amount of water or by adding a corresponding amount of water to a dry polysaccharide.

The delay in dissolution of polysaccharides achieved by means of dialdehydes is based on the formation of hemiacetals which occurs by an acid-catalyzed mechanism. The use of acids, such as organic and inorganic acids, for example formic acid, acetic acid, hydrochloric acid, phosphoric acid or sulfuric acid, in the treatment of polysaccharides with dialdehydes is known in the art. Preferably the treatment of the polysaccharide with a dialdehyde is conducted in the presence of an aqueous salt solution comprising at least two salts, one of the salts being a weak acid having a $pK_a$ of from 5.5 to 8.5, preferably from 6.5 to 7.5, and the other salt being a salt of the weak acid having a $pK_a$ of from 5.5 to 8.5, preferably from 6.5 to 7.5. The aqueous salt solution homogeneously sets the pH of the polysaccharide to from 6.0 to 8.0, preferably from 6.5 to 7.5 (measured as a 2 weight percent solution of the polysaccharide in deionized water at 23° C.). The aqueous salt solution can be added simultaneously or together with the solution of the dialdehyde to the polysaccharide, as described in U.S. Pat. No. 7,012,139. Setting of the pH of the cellulose ether to from 6.0 to 8.0, as described in U.S. Pat. No. 7,012,139 gives the same results in respect of a delay in dissolution as does the use of an acid catalyst. As aqueous salt solution, particular preference is given to a solution of an alkali metal dihydrogen phosphate, e.g. sodium dihydrogen phosphate, and a di(alkali metal) hydrogen phosphate, e.g. disodium hydrogen phosphate or sodium potassium hydrogen phosphate. The two salts are preferably used in a molar ratio of from 2:1 to 1:2, particularly preferably in a molar ratio of from 1.2:1 to 1:1.2. The aqueous salt solution is preferably used in such an amount that the salts on a dry basis are present in an amount of from 0.01 to 2% by weight, preferably from 0.1 to 1% by weight, particularly preferably from 0.2 to 0.5% by weight, based on the dry polysaccharide. Any amount of water comprised in an acid composition for catalyzing the formation of hemiacetals or comprised in the aqueous salt solution is to be included in the above-mentioned range of 10 to 40 weight percent.

After treatment of the polysaccharide with a dialdehyde as herein described, the treated polysaccharide can be dried and optionally comminuted or can be subjected to a combined milling/drying in a known manner, for example as described in European Patents EP 1,127,895; EP1,127,910 and EP 1,306,134, and EP 370 447.

Another aspect of the present invention is a method of reducing lumps in a process for dispersing and dissolving water-soluble polysaccharides in water, wherein the polysaccharide is treated with a dialdehyde according to the process above and the treated polysaccharide is dispersed in water.

In the context of water-soluble polymers, dissolution is frequently described as a process with two overlapping phenomena, dispersion and hydration. Dispersion refers to spreading of particles or groups of polymer chains throughout the solution. Hydration refers to loosening of the polymer chains and expansion of their hydrodynamic volume (and corresponding viscosity buildup). If dispersion is poor, or if hydration outpaces dispersion, the hydrated polymer can swell and isolate relatively dry, non-hydrated polymer from the solution, forming lumps. Desirable dispersion and hydration are normally characterized by little to no lump formation.

By treating the polysaccharide with a dialdehyde according to the process of the present invention the solubility of the polysaccharide in water can be significantly delayed or retarded. For the purposes of the present invention, the "delay time" or "retardation" is the time which elapses between the stirring of the polysaccharide into water at 23° C. and the commencement of the dissolution process. If desired, the dissolution of the polysaccharide in water can be triggered or accelerated by means of a deliberate increase in the pH by addition of an alkaline substance, such as sodium hydroxide.

EXAMPLES

The following examples are for illustrative purposes only and are not intended to limit the scope of the present invention. Unless otherwise mentioned, all parts and percentages are by weight.

Measuring the Dissolution Behavior and Delay of Solubility

Figure 4:
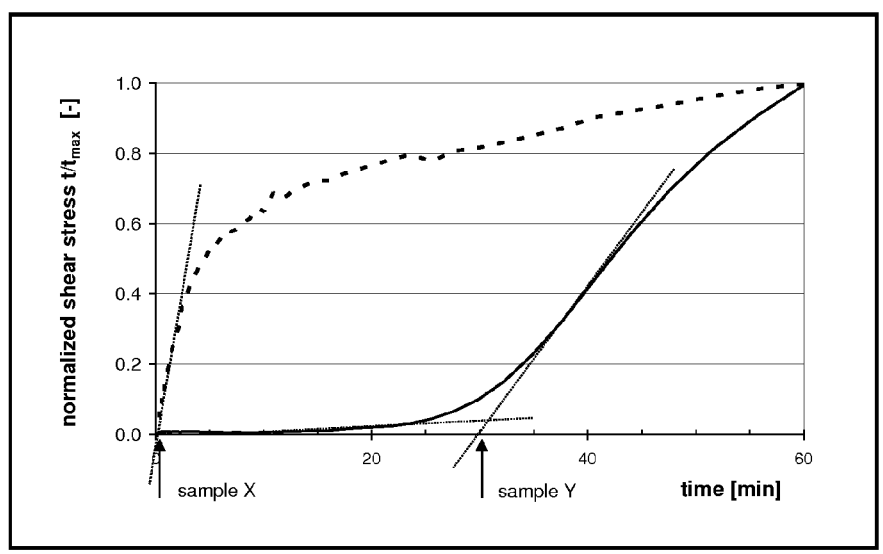
FIG. 4 illustrates how to determine retardation time when dissolving a water-soluble polysaccharide in water.

Delayed or retarded solubility products are meant to swell up and dissolve in aqueous systems after a period of time, so that they will disperse well and not form lumps. This period of time is referred to as "delay" or "retardation". Delay or retardation times are measured by the described method:
4 g of the product is dispersed in 196 ml of a standard buffer solution with a pH of 6.6±0.1 (consisting of 1 volume fraction standard buffer solution pH 7, Riedel de Haen 33546-1 EA, and 1 volume fraction standard butter solution pH 6, Riedel de Haen 3345-1 EA) stiffing in a computer-controlled viscosimeter (Viskotester VT 550 equipped with a blade stirrer Article No. 807-0505 by ThermoHaake with a shear rate of 130 l/s and an angular velocity of 129.9 l/min) While monitoring the shear stress ($\tau$) as a function of time (relative viscosity) a temperature of 23±0.5° C. is maintained inside the glass beaker. On the resultant graph, as illustrated by FIG. 4, two tangents are drawn to determine the point in time (T) at which the greatest rise in viscosity occurs (point of intersection of tangents) which is defined as retardation time herein. In FIG. 4 sample X illustrated a sample without delayed or retarded dissolution. For illustration purposes, sample Y illustrated a sample which exhibits a retarded dissolution of about 30 minutes.

Comparative Examples 1, 2 and 3 (CMC), According to the General Teaching of U.S. Pat. No. 7,012,139

600 g of a carboxymethyl cellulose (CMC) having a DS(methyl) of about 0.9, a moisture content of about 7% by weight and a viscosity of about 31,300 mPa's, determined as a 2 wt.-% aqueous solution at 20° C. in a Viskotester VT 500 by ThermoHaake at a shear rate of 2.55 s$^{-1}$, were placed into a 5 liter batch mixer DVT5 from company Loedige (Germany) which can be characterized as a horizontal blender with plough share mixing elements. Mixing took place with an angular frequency $\omega_w$ of 19 sec$^{-1}$ (resulting in a FROUDE number of FR$_w$=3.4). According to the listed contents of glyoxal and water in Table 1, calculated amounts of a prepared aqueous solution containing glyoxal, water and, as a buffer, Na$_2$HPO$_4$ and NaH$_2$PO$_4$, were sprayed onto the carboxymethyl cellulose over a period of 15 minutes. The amount of phosphate salts were set such that the carboxymethyl cellulose showed a pH from 6.5 to 7.5 (0.45 to 0.65 wt.-% salts based on the initial amount of carboxymethyl cellulose). The blender content was mixed for a further 45 min. The treated carboxymethyl cellulose was dried in an air circulation drying chamber at 70° C. to achieve a water content of less than 10%, milled in a conventional lab mill Alpine 100 UPZ II by Hosokawa Alpine and subsequently sieved. The product obtained with a sieve fraction of 100%<1 mm was dispersed into water to measure the retardation time according to the above mentioned method.

Examples 4 and 5 (CMC)

The same carboxymethyl cellulose as described in comparative examples 1 to 3 was fed continuously with a mass flow rate of 165 kg/h into a ring-layer mixer Corimix CB20 Pi from company Loedige operated with an angular frequency $\omega_w$ of 314 sec$^{-1}$ (resulting in a FROUDE number of FR$_w$=1006). According to the listed contents of glyoxal and water in Table 1, calculated amounts of a prepared aqueous solution containing glyoxal, water and, as a buffer, Na$_2$HPO$_4$ and NaH$_2$PO$_4$ were sprayed onto the carboxymethyl cellulose while passing the ring-layer mixer. The amount of phosphate salts was similar as described in comparative examples 1-3. The liquid was introduced directly into the annular layer of solid particles by a rotating hollow shaft through perforated mixing tools. The product was dried and milled as described in comparative examples 1-3 and was dispersed into water to measure the retardation time according to the above mentioned method.

TABLE 1

| Example | Material | Froude-number | Water Content[1] (%) | Glyoxal content[2] (%) | Retardation time (min.) |
|---|---|---|---|---|---|
| 1* | CMC | 3.4 | 40 | 1.2 | 23 |
| 2* | CMC | 3.4 | 29 | 1.2 | 16 |
| 3* | CMC | 3.4 | 20 | 1.2 | 0 |
| 4 | CMC | 1006 | 29 | 1.2 | 20 |
| 5 | CMC | 1006 | 21 | 1.2 | 4.5 |

TABLE 1-continued

| Example | Material | Froude-number | Water Content[1] (%) | Glyoxal content[2] (%) | Retardation time (min.) |
|---|---|---|---|---|---|

[1] based on the total weight of carboxymethyl cellulose and water
[2] based on the initial amount of carboxymethyl cellulose
*Comparative Example The comparison between comparative example 1 and example 4 illustrates that with the process of the present invention a similar retardation time can be achieved at reduced water contents.

The comparison between comparative example 2 and example 4 illustrates that with the process of the present invention a longer retardation time can be achieved at similar water contents.

The comparison between comparative example 3 and example 5 illustrates that with the process of the present invention a retardation behavior can be achieved at lower water contents than in the known process described in U.S. Pat. No. 7,012,139.

Comparative Example 6 and 7 (HPMC), According to the General Teaching of U.S. Pat. No. 7,012,139

600 g of a hydroxypropyl methylcellulose (HPMC) having a $DS_{methyl}$ of about 1.4, $MS_{hydroxypropyl}$ of about 0.73, a moisture content of about 3.8% by weight and a viscosity of about 37,860 mPa's, determined as a 2 wt.-% aqueous solution at 20° C. in a Viskotester VT 500 by ThermoHaake at a shear rate of 2.55 s$^{-1}$, were placed into a 5 liter batch mixer DVT5 from company Loedige, Germany which can be characterized as a horizontal blender with plough share mixing elements. Mixing took place with an angular frequency $\omega_w$ of 19 sec$^{-1}$ (resulting in a FROUDE number of $FR_w$=3.4). According to the listed contents of glyoxal and water in Table 2, calculated amounts of a prepared aqueous solution containing glyoxal, water and formic acid were sprayed onto the material over a period of 15 minutes. The amount of formic acid was set such that the hydroxypropyl methylcellulose showed a pH<7 (0.15 to 0.25 wt.-% formic acid based on the initial amount of hydroxypropyl methylcellulose). The mixture was mixed for a further 45 min. The treated hydroxypropyl methylcellulose was dried in an air circulation drying chamber at 70° C. to achieve a water content of less than 5%, milled in a conventional lab mill Alpine 100 UPZ II by Hosokawa Alpine and subsequently sieved. The product obtained with a sieve fraction of 100%<1 mm was dispersed into water to measure the retardation time according to the above mentioned method.

Example 8-12 (HPMC)

The same hydroxypropyl methylcellulose as described in comparative examples 6 and 7 was fed continuously with a mass flow rate of 86 kg/h into a ring-layer mixer Corimix CB20 Pi from company Loedige operated with an angular frequency $\omega_w$ of 314 sec$^{-1}$ (resulting in a FROUDE number of $FR_w$=1006). According to the listed contents of glyoxal and water in Table 2, calculated amounts of a prepared aqueous solution containing glyoxal, water and formic acid were sprayed onto the hydroxypropyl methylcellulose while passing the ring-layer mixer. The amount of formic acid was similar as described in comparative examples 6 and 7. The liquid was introduced directly into the annular layer of solid particles by a rotating hollow shaft through perforated mixing tools. The dried and milled product as described in examples 6 and 7 was dispersed into water to measure the retardation time according to the above mentioned method.

TABLE 2

| Example | Material | Froude-number | Water Content[1] (%) | Glyoxal content[2] (%) | Retardation time (min.) |
|---|---|---|---|---|---|
| 6* | HPMC | 3.4 | 40 | 0.7 | 47 |
| 7* | HPMC | 3.4 | 40 | 1.2 | 64 |
| 8 | HPMC | 1006 | 15 | 0.7 | 34 |
| 9 | HPMC | 1006 | 22 | 0.7 | 47 |
| 10 | HPMC | 1006 | 30 | 0.7 | 48 |
| 11 | HPMC | 1006 | 20 | 1.2 | 64 |
| 12 | HPMC | 1006 | 25 | 1.2 | 66 |

[1] based on the total weight of hydroxypropyl methylcellulose and water.
[2] based on the initial amount of hydroxypropyl methylcellulose
*Comparative Example The comparisons between comparative example 6 and examples 9 and 10 and comparative example 7 and examples 11 and 12 illustrate that with the process of the present invention a similar retardation time can be achieved at reduced water contents.

Comparative Example 13 and Examples 14-16 (HPMC)

The same hydroxypropyl methylcellulose as described in (comparative) examples 6 to 12 was subjected to a treatment as described in examples 8 to 12. According to the listed contents of glyoxal and water in Table 3, calculated amounts of a prepared aqueous solution containing glyoxal, water and formic acid were sprayed onto the hydroxypropyl methylcellulose while passing the ring-layer mixer. The amount of formic acid was similar as described in comparative examples 6 and 7. The material after the ring-layer mixer was milled and dried simultaneously by use of an Ultrarotor mill UR II (commercially available from Altenburger, Germany) and subsequently sieved. The product obtained with a sieve fraction of 100%<1 mm was dispersed into water to measure the retardation time according to the above mentioned method.

TABLE 3

| Example | Material | Froude-number | Water Content[1] (%) | Glyoxal content[2] (%) | Retardation time (min.) |
|---|---|---|---|---|---|
| 13* | HPMC | 1006 | 8 | 1.2 | 38 |
| 14 | HPMC | 1006 | 20 | 1.2 | 54 |
| 15 | HPMC | 1006 | 25 | 1.2 | 59 |
| 16 | HPMC | 1006 | 22 | 0.7 | 36 |

[1] based on the total weight of hydroxypropyl methylcellulose/carboxymethyl cellulose and water.
[2] based on the initial amount of hydroxypropyl methylcellulose/carboxymethyl cellulose.
*Comparative Example 13 is a comparative example, close to the general teaching of U.S. Pat. No. 5,674,999, but has a higher water content than that disclosed in U.S. Pat. No. 5,674,999.

The comparisons between comparative example 13 and examples 14 and 15 illustrate that with the process of the present invention an increased retardation time can be achieved.

The comparisons between comparative example 13 and example 16 illustrate that with the process of the present invention a similar retardation time can be achieved by use of a reduced glyoxal amount.

It should be noted that only examples are directly comparable that are milled and dried in the same manner. Since the (comparative) Examples 13-16 were milled and dried in different equipment than the (comparative) Examples 6-12, the retardation times in Table 3 are not directly comparable with the retardation times in Table 2.

Comparison Between CMC and HPMC

The same Carboxymethyl cellulose of the same material as described in examples 1 to 5 was subjected to a treatment as described in examples 4 and 5. At a water content of 11% and a glyoxal content of 1.2%, no retardation was observed.

In contrast thereto, hydroxypropyl methylcellulose that was treated according to Example 8, which means that it was treated in the same ring-layer mixer and in the same mill as the Carboxymethyl cellulose, but at a water content of 15% and a glyoxal content of 0.7% showed a retardation of 34 minutes.

The invention claimed is:

1. A process for treating a cellulose ether with 0.1 to 4% by weight, based on dry cellulose ether, of a dialdehyde in the presence of from 10 to 40 weight percent of water, based on the total weight of cellulose ether and water, in a mixing device characterized by a FROUDE number $FR_w$ of at least 200, wherein $$Fr_w = \frac{\omega_w^2 R_w}{g},$$

wherein $\omega_w$ is the angular frequency in $sec^{-1}$ and is defined as $2*\pi*RPM/60$, RPM is the rotational speed of the mixing device in revolutions per minute, $R_w$ is the radius of the mixing device in m, and g is the acceleration due to gravity in $m/s^2$.

2. The process of claim 1 wherein the cellulose ether is treated with the dialdehyde in the presence of from 15 to 40 weight percent of water.

3. The process of claim 1 wherein the cellulose ether is a methyl cellulose or a hydroxy-$C_{1-3}$-alkyl methyl cellulose.

4. The process of claim 3 wherein the process is conducted in the presence of from 10 to 30 weight percent of water.

5. The process of claim 1 wherein the cellulose ether is a carboxymethyl cellulose, carboxymethyl hydroxyethyl cellulose, hydroxyethyl cellulose or ethyl hydroxyethyl cellulose.

6. The process of claim 5 wherein the process is conducted in the presence of from 20 to 40 weight percent of water.

7. The process of claim 1 wherein the mixing device is a mixer with a mixing shaft.

8. The process of claim 1 wherein the mixing device is a continuous high speed horizontal paddle mixer.

9. The process of claim 1 wherein the dialdehyde is glyoxal.

10. The process of claim 1 wherein the treatment is conducted in the presence of an acid.

11. The process of claim 1 wherein the treatment is conducted in the presence of an aqueous salt solution comprising at least two salts, one of the salts being a weak acid having a $pK_a$ of from 5.5 to 8.5, and the other salt being the salt of the weak acid having a $pK_a$ of from 5.5 to 8.5.

12. The process of claim 1 wherein the cellulose ether is milled and dried simultaneously after the treatment with a dialdehyde.

13. A method of reducing lumps in a process for dispersing and dissolving water-soluble cellulose ethers in water, wherein the cellulose ether is treated with a dialdehyde according to the process of claim 1 and the treated cellulose ether is dispersed in water.

14. The process of claim 1 wherein the mixing device has a FROUDE number $FR_w$ of at least 500.

* * * * *